UNITED STATES PATENT OFFICE.

EDWARD POLLARD, OF DAVENPORT, IOWA.

IMPROVEMENT IN THE MODE OF PLACING DESIGNS UPON GLASS FOR ETCHING.

Specification forming part of Letters Patent No. 215,667, dated May 20, 1879; application filed September 27, 1878.

*To all whom it may concern:*

Be it known that I, EDWARD POLLARD, of Davenport, in the county of Scott, in the State of Iowa, have invented a new and Improved Mode of Placing Designs upon Glass for the Purpose of Etching; and I do hereby declare that the following is a full and exact description thereof.

My invention relates to the forming of etchings on glass by means of printing with flexible or elastic type and the action of acids on the sand-blast.

This improvement consists in the use of a specially-prepared ink, and in the application of heat to this ink after it is applied to the surface of the glass.

To enable others skilled in the art to make and use my invention, I will describe my process. I print my design upon the glass, by means of an elastic type or stereotype, with an ink made as follows, in such proportions as will insure its printing and protecting the glass from the action of the acid or sand-blast. I dissolve wax, paraffine, spermaceti, stearic acid, or any other protecting ingredient in turpentine or asphaltum varnish, to which I add balsam of copaiba or balsam of fir. I heat the glass to cause the ink to conform to the inequalities of the surface, to expel the volatile parts, and to cause the protecting matter to coalesce and form a perfect coat on the glass. I then expose the glass with the design upon it to the action of hydrofluoric acid or the sand-blast, or to the vapor arising from fluor-spar and sulphuric acid placed in a lead pan and heated on a sand-bath or any acid that will cut the glass. The parts of the glass not protected are cut away or frosted, leaving the covered part of the glass clear as it originally was.

Among the many uses to which my invention would be of great benefit, I would mention the following: ornamenting door-fronts of glass, glass show-cards, and etching the names of streets on the panes of glass in street-lamps. Landscape views or any fine engraving can be etched upon glassware—such as goblets, decanters, &c.—it not being necessary to have a flat surface to print upon.

I am aware that it is not new to print upon glass surfaces by means of elastic type, nor to etch by acids on surfaces thus printed.

What I claim as my invention is—

1. The improved ink for printing upon glass surfaces to be etched, consisting of wax, paraffine, spermaceti, stearic acid, or equivalent protecting material, dissolved in turpentine or other suitable solvent, and mixed with balsam of copaiba or balsam of fir.

2. As an improvement in the art of printing on glass with the described ink, the mode of causing the ink to conform to the surface and form a perfect coat by heating in the manner described.

EDWARD POLLARD.

Witnesses:
JULIUS SCHUTT,
CHARLES HADE.